O. HILL.
SPEED CHANGING MECHANISM.
APPLICATION FILED APR. 23, 1920.
1,373,071.
Patented Mar. 29, 1921.
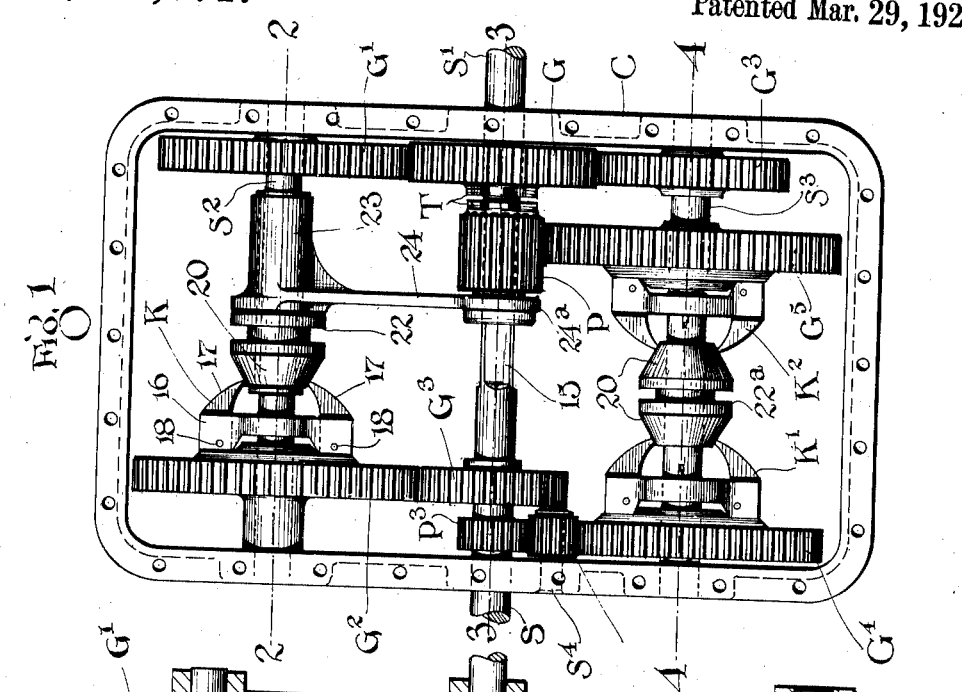
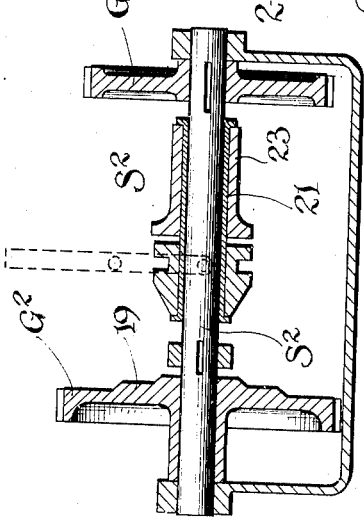
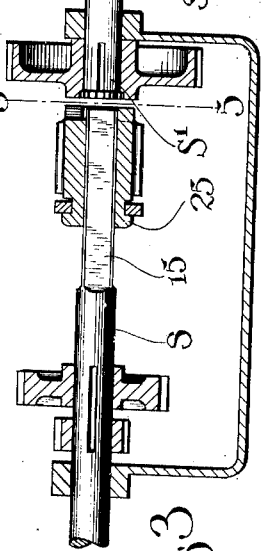
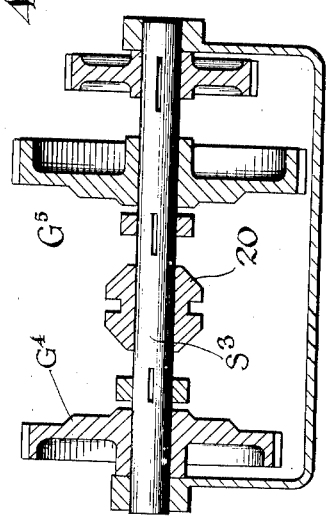
WITNESSES
INVENTOR
Oscar Hill.
ATTORNEYS

UNITED STATES PATENT OFFICE.

OSCAR HILL, OF CRAWFORDSVILLE, INDIANA.

SPEED-CHANGING MECHANISM.

1,373,071.

Specification of Letters Patent.　Patented Mar. 29, 1921.

Application filed April 23, 1920. Serial No. 376,051.

*To all whom it may concern:*

Be it known that I, OSCAR HILL, a citizen of the United States, and a resident of Crawsfordsville, in the county of Montgomery and State of Indiana, have invented certain new and useful Improvements in Speed-Changing Mechanism, of which the following is a specification.

My invention relates to speed changing mechanisms particularly adapted, although not necessarily, to motor vehicles for varying the speed of the driving wheels.

It is a purpose of my invention to provide a speed changing mechanism in which the necessity of shifting the gears to secure the various speeds is eliminated thereby preventing the possibility of stripping the gears and dispensing with the usual objectionable noise incident to the shifting operation.

I will describe one form of speed changing mechanism embodying my invention and will then point out the novel features thereof in claims.

In the accompanying drawings:

Figure 1 is a view showing in top plan one form of speed changing mechanism embodying my invention.

Fig. 2 is a transverse vertical sectional view taken on the line 2—2 of Fig. 1.

Figs. 3 and 4 are views similar to Fig. 2 taken on the lines 3—3 and 4—4, respectively.

Fig. 5 is a view taken on the line 5—5 of Fig. 3 showing the construction of one end of the driving shaft or driven shaft.

Similar reference characters refer to similar parts in each of the several views.

Referring specifically to the drawings and particularly to Fig. 1, C designates the casing for the mechanism, only one half of the casing being shown in the present instance, to reveal the construction of the speed changing mechanism. S designates a driving shaft and S' a driven shaft, both of such shafts having portions thereof journaled within the casing C in such manner that their inner ends are arranged in confronting relation to each other at a point within the casing. The forward or right hand end of the driving shaft S is squared as indicated at 15 and upon this squared portion is slidably fitted a relatively large pinion P. The pinion is provided with a squared bore as shown in Fig. 3 so that it at all times rotates with the driving shaft S but can be moved forwardly or rearwardly toward and away from the driven shaft S'. The rear end of the driven shaft S' has keyed thereto a gear G which constantly meshes with other gears as will be hereinafter described. The confronting ends of the shafts S and S' are adapted to be operatively connected to each other when the pinion P is in its forward extreme position, the hubs of the gear G and the pinion P being recessed at intervals to provide a circular series of teeth T each of which is of the form shown in Fig. 5. When the teeth T of the gear G are in mesh with the teeth of the pinion P, a driving connection between the gear and pinion is effected, and as the pinion and gear are rotatable with the shafts S and S' respectively, it is obvious that a driving of the driven shaft is effected by the driving shaft.

Arranged at opposite sides and in parallel relation to the shafts S and S' are counter shafts $S^2$ and $S^3$ which carry gears that mesh with gears upon the driving and driven shafts for securing the different speeds, as will be understood. As illustrated to advantage in Fig. 2, the counter shaft $S^2$ is journaled in the casing C and has keyed to its forward or right hand end a gear G'. Adjacent the rear end of the shaft $S^2$ but loosely mounted thereon is another gear $G^2$. As shown in Fig. 1, the gear G' constantly meshes with the gear G of the shaft S', while the gear $G^2$ constantly meshes with a gear $G^3$ fixed to the driving shaft S. The gear $G^2$ is adapted to be operatively connected to the shaft $S^2$ for rotation therewith by means of a clutch generally designated at K. In the present instance, the clutch K comprises a yoke or frame 16 which is keyed to the shaft $S^2$, as shown in Fig. 2 and has its opposite ends bifurcated. In these bifurcated ends, brake shoes 17 are pivotally mounted at a point indicated at 18. As shown in Fig. 1, each brake shoe 17 is provided with a flat rear end that is adapted to bear against a flat surface 19 formed on the forward side of the gear $G^2$. The forward end of each shoe 17 is tapered in width and curved inwardly as shown in Fig. 1 so that it normally engages a conical cam 20 mounted upon a sleeve bearing 21 as clearly shown in Fig. 2. The cam 20 is provided with a grooved collar 22 that is adapted to be engaged by any suitable form of actuating lever in effecting longitudinal movement of the cam to expand or contract the shoe 17. A conventional form of lever has been illustrated in dash lines in Fig. 2. In the normal position of the cam 20 as shown in Figs. 1 and 2, the flat end of each shoe 17 lightly contacts with the surface 19 of the gear G² so that the gear is not locked to the shaft S². However, when the cam 20 is moved to the left as when viewed in Fig. 1, its cam surface engages the pointed ends of the shoes 17 and thereby swings the shoes about the pivots 18 so as to cause their flattened ends to firmly engage the surface 19 and thus lock the gear G² to the yoke or frame 16. As the frame 16 is keyed to the shaft S², it is obvious that a locking of the gear G² to the shaft S² is effected so that when one or the other is rotated, a rotation of the other is effected.

The counter shaft S³ is provided at its forward or right hand end with a gear G³, such gear being keyed to the shaft as shown in Fig. 4 and constantly meshing with the gear G of the shaft S'. Rotatably mounted upon the shaft S² at the rear end thereof is another gear G⁴ which constantly meshes with a pinion P² fixed to a stub shaft S⁴. The pinion P² in turn constantly meshes with the pinion P³ keyed to the driving shaft S. Adjacent the gear G³, the shaft S³ has loosely mounted thereon a gear G⁵ which constantly meshes with the pinion P of the shaft S. The gears G⁴ and G⁵ are adapted to be locked to the shaft S³ for rotation therewith by means of clutches K' and K² respectively, such clutches being of identical construction as the clutch K with the exception that the cams 20 are formed integral with each other in a manner to provide a grooved collar 22ᵃ similar to the collar 22. This collar 22ᵃ provides means for manually operating the cams 20 to move the shoes 17 into or out of contact with the surface 19 of the gears G⁴ and G⁵. It will be understood that when the cams 20 are moved to the right as viewed in Fig. 1, the gear G⁵ will be locked to the shaft S³, and conversely when the cam is moved in the opposite direction the gear G⁵ is released and the gear G⁴ locked to the shaft.

As shown in Figs. 1, 2 and 3, the cam 20 of the clutch K is operatively connected to the pinion P so that when it is moved to releasing position, the pinion P is moved to its forward extreme position to cause the meshing of the teeth T and to thereby operatively connect the shafts S and S'. To this end I provide a sleeve 23 mounted on the sleeve bearing 21. This sleeve 23 is formed integral with an arm 24 having an eye 24ᵃ which embraces the groove of a collar 25 that is formed integral with the pinion P. By this arrangement it will be seen that upon movement of the cam 20, the sleeve 23 is also moved through the medium of the sleeve bearing 21. When the sleeve 23 is moved a corresponding movement is imparted to the arm 24 which will in turn effect the movement of the pinion P.

The operation of the mechanism is as follows:

In the normal position of the mechanism, the clutches K, K' and K² occupy releasing positions as shown in Fig. 1, and the pinion P occupies such a position that the teeth T are unmeshed. It will therefore be seen that the driving of the shaft S is ineffective to drive the shaft S'. The first or low speed at which the driven shaft S' is driven is secured by moving the clutch K² forward to its locking position thereby locking the gear G⁵ to the shaft S³ and effecting a driving of the latter through the pinion P. With the shaft S³ rotating, a driving of the shaft S' is secured through the meshing of gears G³ and G. To secure the second or intermediate speed of the shaft S', the clutch K² is first returned to non-releasing position whereupon the clutch K is moved to gripping position. This causes the gear G² to be locked to the shaft S², and as the gear meshes with the gear G³ of the shaft S, it will be clear that a driving of the counter shaft S² is effected. The shaft S² in turn drives shaft S' through the gears G' and G. The third or high speed of the shaft S' is obtained by moving the cam 20 of the clutch K to the right from the position shown in Fig. 1 so as to cause an advancement of the pinion P to such a position wherein the teeth T intermesh. With the teeth T intermeshing, it is clear that the shafts S and S' are directly connected to each other thereby securing the highest speed at which the shaft S' can be driven from the shaft S. Reverse movement of the shaft S' is obtained by moving the clutch K' to gripping position so that the driving shaft S drives the counter shaft S³ in a reverse direction. The reverse rotation of the shaft S³ is secured as a result of the idle pinion P².

From the foregoing description taken in conjunction with the accompanying drawings, it will be manifest that I have provided a simple and efficient form of speed changing mechanism in which the several gears are at all times in meshing relation with each other, certain of the gears being locked to the several shafts while others are freely rotatable thereon but are adapted to be locked thereto by manually operable clutches to secure the several speeds and thus eliminate the necessity of meshing and unmeshing the gears.

Although I have herein shown and described only one form of speed changing mechanism embodying my invention, it is to be understood that various changes and modifications may be made herein without departing from the spirit of the invention or the spirit and scope of the appended claims.

What I claim is:—

1. A speed changing mechanism comprising, a driving shaft, a driven shaft, a pinion slidable on but rotatable with the driving shaft, a gear keyed to the driven shaft, teeth formed on said gear and pinion and adapted to mesh with each other to effect a driving connection between the two shafts, a pair of counter shafts, gears keyed to said counter shafts and meshing with the gear on said driven shaft, a gear keyed to the driving shaft, a pinion keyed to the driven shaft, a gear loosely mounted on one of the counter shafts and meshing with the gear on said driving shaft, a gear loosely mounted on a second counter shaft and meshing with the first mentioned pinion of said driving shaft, a second gear loosely mounted on the second counter shaft, an idler interposed between and meshing with the second pinion on the driving shaft and the second gear loosely mounted on the second driven shaft, clutches for operatively connecting the gears loosely mounted on the counter shafts to said counter shafts, and means for operatively connecting one of the clutches with the second mentioned pinion for effecting a shifting of the latter with said clutch.

2. A speed changing mechanism comprising, a driving shaft having a squared portion, a driven shaft, a gear fixed to the driven shaft, a pinion slidable on but rotatable with the squared portion of the driving shaft, teeth formed on the hubs of said gear and pinion for operatively connecting the two when the pinion occupies a predetermined position, counter shafts, gears on said counter shafts, certain of said gears being fixed to said counter shafts and the remaining gears loosely mounted thereon, a gear fixed to the driving shaft and meshing with one of the loosely mounted gears of one of the counter shafts, a pinion fixed to the driving shaft, an idle pinion meshing with the last mentioned pinion and with one of the loosely mounted gears of one of the counter shafts, one of said loosely mounted gears meshing with the first pinion on the driving shaft, and clutches for locking the loosely mounted gears to counter shafts, one of said clutches being operatively connected to the first pinion of the driving shaft for effecting a sliding of the pinion.

OSCAR HILL.